(12) United States Patent
Baudat et al.

(10) Patent No.: US 6,640,586 B1
(45) Date of Patent: Nov. 4, 2003

(54) MOTOR DRIVEN COMPRESSOR SYSTEM FOR NATURAL GAS LIQUEFACTION

(75) Inventors: Ned P. Baudat, Sugar Land, TX (US); Bobby D. Martinez, Missouri City, TX (US); Paul R. Hahn, Houston, TX (US); Hans P. Weyermann, Katy, TX (US); Wesley R. Qualls, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/286,292

(22) Filed: Nov. 1, 2002

(51) Int. Cl.[7] .................................................. F25J 1/00
(52) U.S. Cl. .......................................... 62/612; 62/611
(58) Field of Search ............................ 62/611, 612, 613

(56) References Cited

U.S. PATENT DOCUMENTS

| | | | | |
|---|---|---|---|---|
| 3,548,606 A | * | 12/1970 | Kuerston ...................... | 62/612 |
| 3,581,510 A | * | 6/1971 | Hughes ......................... | 62/612 |
| 4,539,028 A | * | 9/1985 | Paradowski et al. ........... | 62/612 |
| 4,566,885 A | * | 1/1986 | Haak ............................ | 62/613 |
| 4,680,041 A | * | 7/1987 | DeLong ........................ | 62/612 |
| 4,755,200 A | * | 7/1988 | Liu et al. ...................... | 62/612 |
| 5,473,900 A | * | 12/1995 | Low ............................. | 62/611 |
| 5,689,141 A | | 11/1997 | Kikkawa et al. | |
| 5,943,881 A | | 8/1999 | Grenier | |
| 6,070,429 A | * | 6/2000 | Low et al. .................... | 62/612 |
| 6,272,882 B1 | | 8/2001 | Hodges et al. | |
| 6,324,867 B1 | * | 12/2001 | Fanning et al. ............... | 62/613 |
| 6,367,286 B1 | | 4/2002 | Price | |
| 6,446,465 B1 | * | 9/2002 | Dubar .......................... | 62/613 |
| 2002/0170312 A1 | * | 11/2002 | Reijnen et al. ............... | 62/611 |

OTHER PUBLICATIONS

Bauer, Heinz. "A Novel Concept." *Hydrocarbon Engineering* May 2002: 59–63.

Siemens Aktiengesesellschaft. "The All Electric Driven LNG Plant." Presented at the 1st BP Upstream Energy Conference, May 9, 2001, Sheraton Suites Houston, Texas.

* cited by examiner

Primary Examiner—William C. Doerrler
(74) Attorney, Agent, or Firm—Gary L. Haag

(57) ABSTRACT

Natural gas liquefaction system employing electric motors as compressor drivers. A combination of motors and steam turbines can be powered by a cogeneration plant and employed as drivers.

35 Claims, 3 Drawing Sheets

MOTOR DRIVEN COMPRESSOR SYSTEM FOR NATURAL GAS LIQUEFACTION

BACKGROUND OF THE INVENTION

1. Field of the Invention

This invention concerns a method and an apparatus for liquefying natural gas. In another aspect, the invention concerns an improved driver, compressor, and power source configurations for a cascade-type natural gas liquefaction plant.

2. Description of the Prior Art

The cryogenic liquefaction of natural gas is routinely practiced as a means of converting natural gas into a more convenient form for transportation and storage. Such liquefaction reduces the volume by about 600-fold and results in a product which can be stored and transported at near atmospheric pressure.

With regard to ease of storage, natural gas is frequently transported by pipeline from the source of supply to a distant market. It is desirable to operate the pipeline under a substantially constant and high load factor but often the deliverability or capacity of the pipeline will exceed demand while at other times the demand may exceed the deliverability of the pipeline. In order to shave off the peaks where demand exceeds supply or the valleys when supply exceeds demand, it is desirable to store the excess gas in such a manner that it can be delivered when the supply exceeds demand. Such practice allows future demand peaks to be met with material from storage. One practical means for doing this is to convert the gas to a liquefied state for storage and to then vaporize the liquid as demand requires.

The liquefaction of natural gas is of even greater importance when transporting gas from a supply source which is separated by great distances from the candidate market and a pipeline either is not available or is impractical. This is particularly true where transport must be made by ocean-going vessels. Ship transportation in the gaseous state is generally not practical because appreciable pressurization is required to significantly reduce the specific volume of the gas. Such pressurization requires the use of more expensive storage containers.

In order to store and transport natural gas in the liquid state, the natural gas is preferably cooled to −240° F. to −260° F. where the liquefied natural gas (LNG) possesses a near-atmospheric vapor pressure. Numerous systems exist in the prior art for the liquefaction of natural gas in which the gas is liquefied by sequentially passing the gas at an elevated pressure through a plurality of cooling stages whereupon the gas is cooled to successively lower temperatures in sequential refrigeration cycles until the liquefaction temperature is reached. Cooling is generally accomplished by heat exchange with one or more refrigerants such as propane, propylene, ethane, ethylene, methane, nitrogen or combinations of the preceding refrigerants (e.g., mixed refrigerant systems). A liquefaction methodology which is particularly applicable to the current invention employs a closed propane cycle as the initial refrigeration cycle, a closed ethylene cycle as the intermediate refrigerant cycle, and an open methane cycle as the final refrigeration cycle. In the open methane cycle a pressurized LNG-bearing stream is flashed and the flash vapors (i.e., the flash gas stream(s)) are subsequently employed as cooling agents, recompressed, cooled, combined with the processed natural gas feed stream and liquefied thereby producing the pressurized LNG-bearing stream.

Each of the refrigeration cycles of a cascade-type natural gas liquefaction plant includes a compressor, or a set of compressors, for increasing the pressure of the refrigerant after it has been used to cool the natural gas. The high pressure refrigerant exiting the compressor(s) is first cooled via indirect heat exchange and then expanded prior to being employed as a cooling agent to cool the natural gas stream. The refrigerant compressors employed in LNG plants are typically powered by large gas turbines such as, for example, Frame 5 or Frame 7 gas turbines that are available from GE Power Systems of Atlanta, Ga.

Although conventional gas turbines provide efficient power production, the use of gas turbine drivers in LNG plants has several drawbacks. For example, "off-the-shelf" gas turbines are available only in predetermined fixed sizes (i.e., load ratings) and it is generally too expensive to have a gas turbine custom designed and manufactured for a certain load requirement. Thus, in many instances commercially available gas turbines are either oversized or undersized for the given application in a LNG plant. This mismatching of optimum design load and actual plant load can require oversized gas turbines to be employed in a LNG plant. Such oversized gas turbines are typically more expensive than would be required if the actual plant load and designed turbine load were the same. Further, operating an oversized gas turbine at less than optimum design load causes the gas turbine to be less efficient.

Another disadvantage of employing gas turbine drivers to power the refrigerant compressors in a LNG plant is that the burning of fuel in the gas turbines causes emissions (e.g., $NO_x$ and $SO_2$) that must be monitored in order to comply with local environmental standards. With the increasing stringency of emissions regulations, it can be difficult and expensive to monitor and comply with such regulations.

A further disadvantage of using gas turbines in LNG plants is the fact that only a handful of companies make suitable gas turbines. Thus, availability of an appropriately sized turbine can be severely limited if the demand for that particular turbine is high.

Another drawback of using gas turbines to power compressors in a LNG plant is that gas turbines can be difficult and time consuming to start up.

OBJECTS AND SUMMARY OF THE INVENTION

It is, therefore, an object of the present invention to provide a novel natural gas liquefaction system employing mechanical drivers that can be cost-effectively tailored to suit specific load requirements of the LNG plant.

A further object of the invention is to provide a novel natural gas liquefaction system having reduced emissions due to the use of low-emissions mechanical drivers.

Another object of the invention is to provide a novel natural gas liquefaction system employing mechanical drivers that are readily available from multiple sources throughout the world.

Still another object of the invention is to provide a novel natural gas liquefaction system employing mechanical drivers that are easy and quick to start.

It should be noted that the above objects are exemplary and need not all be accomplished by the claimed invention. Other objects and advantages of the invention will be apparent from the written description and drawings.

Accordingly, in one embodiment of the present invention, there is provided a process for liquefying natural gas comprising the steps of: (a) driving a first compressor and a second compressor with a first electric motor; (b) driving a third compressor and a fourth compressor with a second electric motor; (c) compressing a first refrigerant of a first refrigeration cycle in the first and third compressors; and (d) compressing a second refrigerant of a second refrigeration cycle in the second and fourth compressors.

In another embodiment of the present invention, there is provided a process for liquefying natural gas comprising the steps of: (a) generating steam and electricity in a cogeneration plant; (b) using at least a portion of the electricity to power a first electric motor; (c) using at least a portion of the steam to power a first steam turbine; (d) compressing a first refrigerant of a first refrigeration cycle in a first compressor driven by the first electric motor; and (e) compressing a second refrigerant of a second refrigeration cycle in a second compressor driven by the first steam turbine.

In still another embodiment of the present invention, there is provided an apparatus for liquefying natural gas by cooling the natural gas via a plurality of sequential refrigeration cycles. The apparatus comprises first, second, and third refrigeration cycles and first, second, and third electric motors. The first, second, and third refrigeration cycles include first, second, and third compressors for compressing first, second, and third refrigerants respectively. The first, second, and third electric motors are operable to drive the first, second, and third compressors respectively. The first refrigerant comprises in major portion a hydrocarbon selected from the group consisting of propane, propylene, and mixtures thereof. The second refrigerant comprises in major portion a hydrocarbon selected from the group consisting of ethane, ethylene, and mixtures thereof. The third refrigerant comprises in major portion methane.

In a still further embodiment of the present invention, there is provided an apparatus for liquefying natural gas by cooling the natural gas via a plurality of sequential refrigeration cycles. The apparatus comprises a first refrigeration cycle, a second refrigeration cycle, a cogeneration plant, a first electric motor, and a first steam turbine. The first refrigeration cycle includes a first compressor for compressing a first refrigerant. The second refrigeration cycle includes a second compressor for compressing a second refrigerant. The cogeneration plant is operable to simultaneously generate electricity and steam. The first electric motor is drivably coupled to the first compressor and is powered by at least a portion of the electricity generated by the cogeneration plant. The first steam turbine is drivingly coupled to the second compressor and is powered by at least a portion of the steam generated by the cogeneration plant.

BRIEF DESCRIPTION OF THE DRAWING FIGURES

A preferred embodiment of the present invention is described in detail below with reference to the attached drawing figures, wherein:

FIG. 1 is a simplified flow diagram of a cascaded refrigeration process for LNG production which employs a novel driver and compressor system. The numbering scheme in FIG. 1 can be summarized as follows:

100–199: Conduits for primarily methane streams

200–299: Equipment and vessels for primarily methane streams

300–399: Conduits for primarily propane streams

400–499: Equipment and vessels for primarily propane streams

500–599: Conduits for primarily ethylene streams

600–699: Equipment and vessels for primarily ethylene streams

700–799: Mechanical drivers

DETAILED DESCRIPTION OF THE PREFERRED EMBODIMENT

Figure 1:
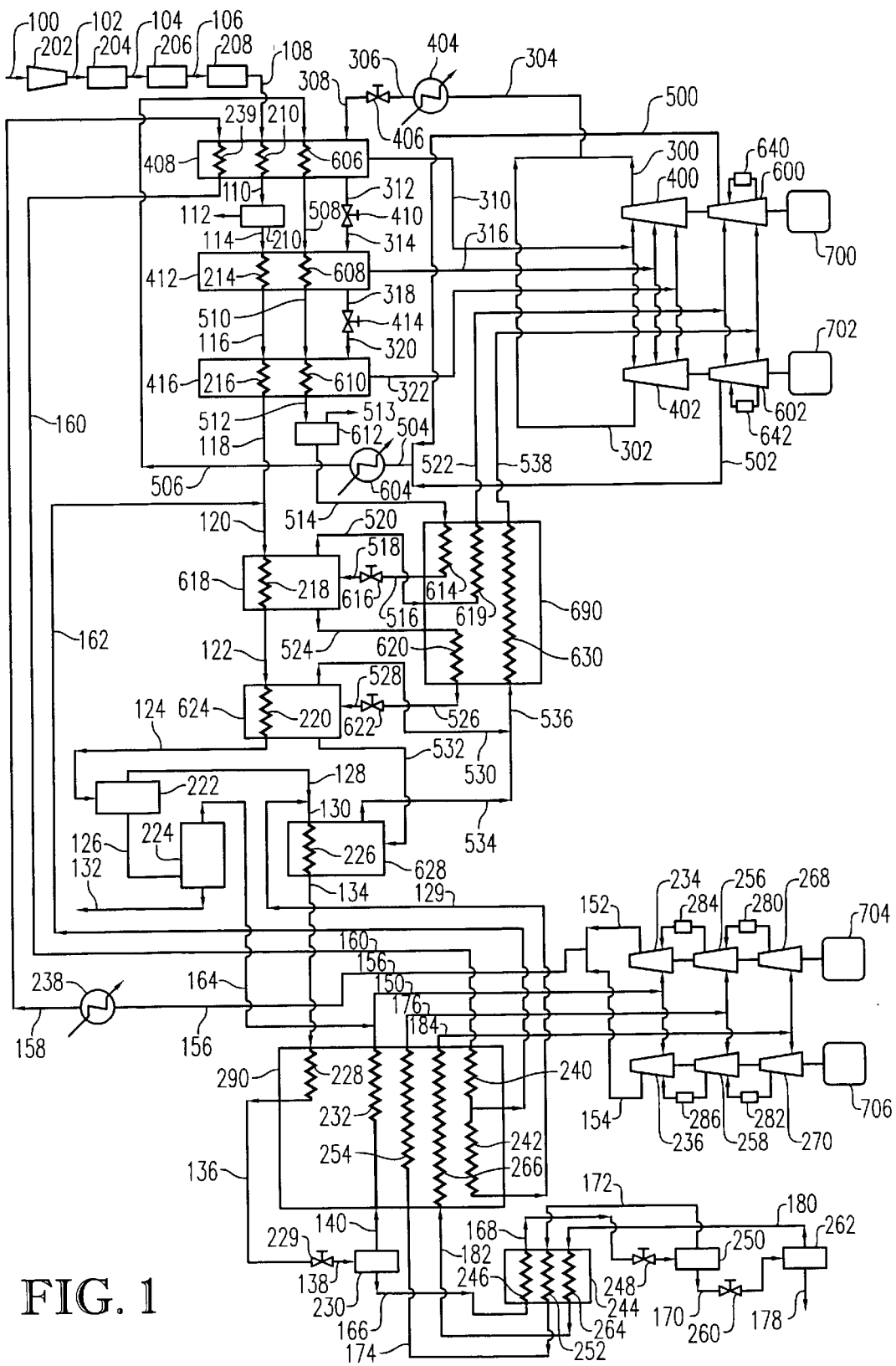

As used herein, the term open-cycle cascaded refrigeration process refers to a cascaded refrigeration process comprising at least one closed refrigeration cycle and one open refrigeration cycle where the boiling point of the refrigerant/cooling agent employed in the open cycle is less than the boiling point of the refrigerating agent or agents employed in the closed cycle(s) and a portion of the cooling duty to condense the compressed open-cycle refrigerant/cooling agent is provided by one or more of the closed cycles. In the current invention, methane or a predominately methane stream is employed as the refrigerant/cooling agent in the open cycle. This stream is comprised of the processed natural gas feed stream and the compressed open methane cycle gas streams.

The design of a cascaded refrigeration process involves a balancing of thermodynamic efficiencies and capital costs. In heat transfer processes, thermodynamic irreversibilities are reduced as the temperature gradients between heating and cooling fluids become smaller, but obtaining such small temperature gradients generally requires significant increases in the amount of heat transfer area, major modifications to various process equipment and the proper selection of flow rates through such equipment so as to ensure that both flowrates and approach and outlet temperatures are compatible with the required heating/cooling duty.

One of the most efficient and effective means of liquefying natural gas is via an optimized cascade-type operation in combination with expansion-type cooling. Such a liquefaction process is comprised of the sequential cooling of a natural gas stream at an elevated pressure, for example about 625 psia, by sequentially cooling the gas stream by passage through a multistage propane cycle, a multistage ethane or ethylene cycle, and an open-end methane cycle which utilizes a portion of the feed gas as a source of methane and which includes therein a multistage expansion cycle to further cool the same and reduce the pressure to near-atmospheric pressure. In the sequence of cooling cycles, the refrigerant having the highest boiling point is utilized first followed by a refrigerant having an intermediate boiling point and finally by a refrigerant having the lowest boiling point. As used herein, the term "propane chiller" shall denote a cooling system that employs a refrigerant having a boiling point the same as, or similar to, that of propane or propylene. As used herein, the term "ethylene chiller" shall denote a cooling system that employs a refrigerant having a boiling point the same as, or similar to, that of ethane or ethylene. As used herein, the terms "upstream" and "downstream" shall be used to describe the relative positions of various components of a natural gas liquefaction plant along the flow path of natural gas through the plant.

Various pretreatment steps provide a means for removing undesirable components, such as acid gases, mercaptan, mercury, and moisture from the natural gas feed stream delivered to the facility. The composition of this gas stream may vary significantly. As used herein, a natural gas stream is any stream principally comprised of methane which originates in major portion from a natural gas feed stream, such feed stream for example containing at least 85 percent methane by volume, with the balance being ethane, higher hydrocarbons, nitrogen, carbon dioxide and a minor amounts of other contaminants such as mercury, hydrogen sulfide, and mercaptan. The pretreatment steps may be separate steps located either upstream of the cooling cycles or located downstream of one of the early stages of cooling in the initial cycle. The following is a non-inclusive listing of some of the available means which are readily available to one skilled in the art. Acid gases and to a lesser extent mercaptan are routinely removed via a sorption process employing an aqueous amine-bearing solution. This treatment step is generally performed upstream of the cooling stages in the initial cycle. A major portion of the water is routinely removed as a liquid via two-phase gas-liquid separation following gas compression and cooling upstream of the initial cooling cycle and also downstream of the first cooling stage in the initial cooling cycle. Mercury is routinely removed via mercury sorbent beds. Residual amounts of water and acid gases are routinely removed via the use of properly selected sorbent beds such as regenerable molecular sieves.

The pretreated natural gas feed stream is generally delivered to the liquefaction process at an elevated pressure or is compressed to an elevated pressure, that being a pressure greater than 500 psia, preferably about 500 psia to about 900 psia, still more preferably about 500 psia to about 675 psia, still yet more preferably about 600 psia to about 675 psia, and most preferably about 625 psia. The stream temperature is typically near ambient to slightly above ambient. A representative temperature range being 60° F. to 138° F.

As previously noted, the natural gas feed stream is cooled in a plurality of multistage (for example, three) cycles or steps by indirect heat exchange with a plurality of refrigerants, preferably three. The overall cooling efficiency for a given cycle improves as the number of stages increases but this increase in efficiency is accompanied by corresponding increases in net capital cost and process complexity. The feed gas is preferably passed through an effective number of refrigeration stages, nominally two, preferably two to four, and more preferably three stages, in the first closed refrigeration cycle utilizing a relatively high boiling refrigerant. Such refrigerant is preferably comprised in major portion of propane, propylene or mixtures thereof, more preferably the refrigerant comprises at least about 75 mole percent propane, even more preferably at least 90 mole percent propane, and most preferably the refrigerant consists essentially of propane. Thereafter, the processed feed gas flows through an effective number of stages, nominally two, preferably two to four, and more preferably two or three, in a second closed refrigeration cycle in heat exchange with a refrigerant having a lower boiling point. Such refrigerant is preferably comprised in major portion of ethane, ethylene or mixtures thereof, more preferably the refrigerant comprises at least about 75 mole percent ethylene, even more preferably at least 90 mole percent ethylene, and most preferably the refrigerant consists essentially of ethylene. Each cooling stage comprises a separate cooling zone. As previously noted, the processed natural gas feed stream is combined with one or more recycle streams (i.e., compressed open methane cycle gas streams) at various locations in the second cycle thereby producing a liquefaction stream. In the last stage of the second cooling cycle, the liquefaction stream is condensed (i.e., liquefied) in major portion, preferably in its entirety thereby producing a pressurized LNG-bearing stream. Generally, the process pressure at this location is only slightly lower than the pressure of the pretreated feed gas to the first stage of the first cycle.

Generally, the natural gas feed stream will contain such quantities of $C_2$+components so as to result in the formation of a $C_2$+rich liquid in one or more of the cooling stages. This liquid is removed via gas-liquid separation means, preferably one or more conventional gas-liquid separators. Generally, the sequential cooling of the natural gas in each stage is controlled so as to remove as much as possible of the $C_2$ and higher molecular weight hydrocarbons from the gas to produce a gas stream predominating in methane and a liquid stream containing significant amounts of ethane and heavier components. An effective number of gas/liquid separation means are located at strategic locations downstream of the cooling zones for the removal of liquids streams rich in $C_2$+components. The exact locations and number of gas/liquid separation means, preferably conventional gas/liquid separators, will be dependant on a number of operating parameters, such as the $C_2$+composition of the natural gas feed stream, the desired BTU content of the LNG product, the value of the $C_2$+components for other applications and other factors routinely considered by those skilled in the art of LNG plant and gas plant operation. The $C_2$+hydrocarbon stream or streams may be demethanized via a single stage flash or a fractionation column. In the latter case, the resulting methane-rich stream can be directly returned at pressure to the liquefaction process. In the former case, this methane-rich stream can be repressurized and recycle or can be used as fuel gas. The $C_2$+hydrocarbon stream or streams or the demethanized $C_2$+hydrocarbon stream may be used as fuel or may be further processed such as by fractionation in one or more fractionation zones to produce individual streams rich in specific chemical constituents (ex., $C_2$, $C_3$, $C_4$ and $C_5$ +).

The pressurized LNG-bearing stream is then further cooled in a third cycle or step referred to as the open methane cycle via contact in a main methane economizer with flash gases (i.e., flash gas streams) generated in this third cycle in a manner to be described later and via expansion of the pressurized LNG-bearing stream to near atmospheric pressure. The flash gases used as a refrigerant in the third refrigeration cycle are preferably comprised in major portion of methane, more preferably the refrigerant comprises at least about 75 mole percent methane, still more preferably at least 90 mole percent methane, and most preferably the refrigerant consists essentially of methane. During expansion of the pressurized LNG-bearing stream to near atmospheric pressure, the pressurized LNG-bearing stream is cooled via at least one, preferably two to four, and more preferably three expansions where each expansion employs as a pressure reduction means either Joule-Thomson expansion valves or hydraulic expanders. The expansion is followed by a separation of the gas-liquid product with a separator. When a hydraulic expander is employed and properly operated, the greater efficiencies associated with the recovery of power, a greater reduction in stream temperature, and the production of less vapor during the flash step will frequently more than off-set the more expensive capital and operating costs associated with the expander. In one embodiment, additional cooling of the pressurized LNG-bearing stream prior to flashing is made possible by first flashing a portion of this stream via one or more hydraulic expanders and then via indirect heat exchange means employing said flash gas stream to cool the remaining portion of the pressurized LNG-bearing stream prior to flashing. The warmed flash gas stream is then recycled via return to an appropriate location, based on temperature and pressure considerations, in the open methane cycle and will be recompressed.

When the pressurized LNG-bearing stream, preferably a liquid stream, entering the third cycle is at a preferred pressure of about 550–650 psia, representative flash pressures for a three stage flash process are about 170–210, 45–75, and 10–40 psia. Flashing of the pressurized LNG-bearing stream, preferably a liquid stream, to near atmospheric pressure produces an LNG product possessing a temperature of about −240° F. to −260° F.

A cascaded process uses one or more refrigerants for transferring heat energy from the natural gas stream to the refrigerant and ultimately transferring said heat energy to the environment. In essence, the overall refrigeration system functions as a heat pump by removing heat energy from the natural gas stream as the stream is progressively cooled to lower and lower temperatures.

The liquefaction process may use one of several types of cooling which include but is not limited to (a) indirect heat exchange, (b) vaporization, and (c) expansion or pressure reduction. Indirect heat exchange, as used herein, refers to a process wherein the refrigerant cools the substance to be cooled without actual physical contact between the refrigerating agent and the substance to be cooled. Specific examples of indirect heat exchange means include heat exchange undergone in a shell-and-tube heat exchanger, a core-in-kettle heat exchanger, and a brazed aluminum plate-fin heat exchanger. The physical state of the refrigerant and substance to be cooled can vary depending on the demands of the system and the type of heat exchanger chosen. Thus, a shell-and-tube heat exchanger will typically be utilized where the refrigerating agent is in a liquid state and the substance to be cooled is in a liquid or gaseous state or when one of the substances undergoes a phase change and process conditions do not favor the use of a core-in-kettle heat exchanger. As an example, aluminum and aluminum alloys are preferred materials of construction for the core but such materials may not be suitable for use at the designated process conditions. A plate-fin heat exchanger will typically be utilized where the refrigerant is in a gaseous state and the substance to be cooled is in a liquid or gaseous state. Finally, the core-in-kettle heat exchanger will typically be utilized where the substance to be cooled is liquid or gas and the refrigerant undergoes a phase change from a liquid state to a gaseous state during the heat exchange.

Vaporization cooling refers to the cooling of a substance by the evaporation or vaporization of a portion of the substance with the system maintained at a constant pressure. Thus, during the vaporization, the portion of the substance which evaporates absorbs heat from the portion of the substance which remains in a liquid state and hence, cools the liquid portion.

Finally, expansion or pressure reduction cooling refers to cooling which occurs when the pressure of a gas, liquid or a two-phase system is decreased by passing through a pressure reduction means. In one embodiment, this expansion means is a Joule-Thomson expansion valve. In another embodiment, the expansion means is either a hydraulic or gas expander. Because expanders recover work energy from the expansion process, lower process stream temperatures are possible upon expansion.

The flow schematic and apparatus set forth in FIG. 1 is a preferred embodiment of the inventive liquefaction process. Those skilled in the art will recognized that FIG. 1 is a schematic representation only and therefore, many items of equipment that would be needed in a commercial plant for successful operation have been omitted for the sake of clarity. Such items might include, for example, compressor controls, flow and level measurements and corresponding controllers, temperature and pressure controls, pumps, motors, filters, additional heat exchangers, and valves, etc. These items would be provided in accordance with standard engineering practice.

To facilitate an understanding of FIG. 1, the following numbering nomenclature is employed. Items numbered 100–199 correspond to flow lines or conduits which contain primarily methane. Items numbered 200–299 are process vessels and equipment which contain and/or operate on a fluid stream comprising primarily methane. Items numbered 300–399 correspond to flow lines or conduits which contain primarily propane. Items numbered 400–499 are process vessels and equipment which contain and/or operate on a fluid stream comprising primarily propane. Items numbered 500–599 correspond to flow lines or conduits which contain primarily ethylene. Items numbered 600–699 are process vessels and equipment which contain and/or operate on a fluid stream comprising primarily ethylene. Items numbered 700–799 are mechanical drivers.

Referring to FIG. 1, a natural gas feed stream, as previously described, enters conduit 100 from a natural gas pipeline. In an inlet compressor 202, the natural gas is compressed and air cooled so that the natural gas exiting compressor 202 has a pressure generally in the range of from about 500 psia to about 800 psia and a temperature generally in the range of from about 75° F. to about 175° F. The natural gas then flows to an acid gas removal unit 204 via conduit 102. Acid gas removal unit 204 preferably employs an amine solvent (e.g., Diglycol Amine) to remove acid gases such as $CO_2$ and $H_2S$. Preferably, acid gas removal unit 204 is operable to remove $CO_2$ down to less than 50 ppmv and $H_2S$ down to less than 2 ppmv. After acid gas removal, the natural gas is transferred, via a conduit 104, to a dehydration unit 206 that is operable to remove substantially all water from the natural gas. Dehydration unit 206 preferably employs a multi-bed regenerable molecular sieve system for drying the natural gas. The dried natural gas can then be passed to a mercury removal system 208 via conduit 106. Mercury removal system 208 preferably employs at least one fixed bed vessel containing a sulfur impregnated activated carbon to remove mercury from natural gas. The resulting pretreated natural gas is introduced to the liquefaction system through conduit 108.

As part of the first refrigeration cycle, gaseous propane is compressed in first and second multistage propane compressors 400, 402 driven by first and second electric motor drivers 700, 702, respectively. The three stages of compression are preferably provided by a single unit (i.e., body) although separate units mechanically coupled together to be driven by a single driver may be employed. Upon compression, the compressed propane from first and second propane compressors 400, 402 are conducted via conduits 300, 302, respectively, to a common conduit 304. The compressed propane is then passed through common conduit 304 to a cooler 404. The pressure and temperature of the liquefied propane immediately downstream of cooler 404 are preferably about 100–130° F. and 170–210 psia. Although not illustrated in FIG. 1, it is preferable that a separation vessel be located downstream of cooler 404 and upstream of an expansion valve 406 for the removal of residual light components from the liquefied propane. Such vessels may be comprised of a single-stage gas liquid separator or may be more sophisticated and comprised of an accumulator section, a condenser section and an absorber section, the latter two of which may be continuously operated or periodically brought on-line for removing residual light components from the propane. The stream from this vessel or the stream from cooler 404, as the case may be, is pass through a conduit 306 to a pressure reduction means such as expansion valve 406 wherein the pressure of the liquefied propane is reduced thereby evaporating or flashing a portion thereof. The resulting two-phase product then flows through conduit 308 into high-stage propane chiller 408 for indirect heat exchange with gaseous methane refrigerant introduced via conduit 158, natural gas feed introduced via conduit 108, and gaseous ethylene refrigerant introduced via conduit 506 via indirect heat exchange means 239, 210, and 606, thereby producing cooled gas streams respectively transported via conduits 160, 110 and 312.

The flashed propane gas from chiller 408 is returned to the high stage inlets of first and second propane compressors 400, 402 through conduit 310. The remaining liquid propane is passed through conduit 312, the pressure further reduced by passage through a pressure reduction means, illustrated as expansion valve 410, whereupon an additional portion of the liquefied propane is flashed. The resulting two-phase stream is then fed to an intermediate-stage propane chiller 412 through conduit 314, thereby providing a coolant for chiller 412.

The cooled natural gas feed stream from high-stage propane chiller 408 flows via conduit 110 to a knock-out vessel 210 wherein gas and liquid phases are separated. The liquid phase, which is rich in C3+components, is removed via conduit 112. The gaseous phase is removed via conduit 114 and conveyed to intermediate-stage propane chiller 412. Ethylene refrigerant is introduced to chiller 412 via conduit 508. In chiller 412, the processed natural gas stream and an ethylene refrigerant stream are respectively cooled via indirect heat exchange means 214 and 608 thereby producing a cooled processed natural gas stream and an ethylene refrigerant stream via conduits 116 and 510. The thus evaporated portion of the propane refrigerant is separated and passed through conduit 316 to the intermediate-stage inlets of propane compressors 400, 402. Liquid propane is passed through conduit 318, the pressure further reduced by passage through a pressure reduction means, illustrated as expansion valve 414, whereupon an additional portion of liquefied propane is flashed. The resulting two-phase stream is then fed to a low-stage propane chiller/condenser 416 through conduit 320 thereby providing coolant to chiller 416.

As illustrated in FIG. 1, the cooled processed natural gas stream flows from intermediate-stage propane chiller 412 to low-stage propane chiller/condenser 416 via conduit 116. In chiller 416, the stream is cooled via indirect heat exchange means 216. In a like manner, the ethylene refrigerant stream flows from intermediate-stage propane chiller 412 to low-stage propane chiller/condenser 416 via conduit 510. In the latter, the ethylene refrigerant is condensed via an indirect heat exchange means 610 in nearly its entirety. The vaporized propane is removed from low-stage propane chiller/condenser 416 and returned to the low-stage inlets of propane compressors 400, 402 via conduit 322. Although FIG. 1 illustrates cooling of streams provided by conduits 116 and 510 to occur in the same vessel, the chilling of stream 116 and the cooling and condensing of stream 510 may respectively take place in separate process vessels (ex., a separate chiller and a separate condenser, respectively).

As illustrated in FIG. 1, a portion of the cooled compressed open methane cycle gas stream is provided via conduit 162, combined with the processed natural gas feed stream exiting low-stage propane chiller/condenser 416 via conduit 118, thereby forming a liquefaction stream and this stream is then introduced to a high-stage ethylene chiller 618 via conduit 120. Ethylene refrigerant exits low-stage propane chiller/condenser 416 via conduit 512 and is fed to a separation vessel 612 wherein light components are removed via conduit 513 and condensed ethylene is removed via conduit 514. Separation vessel 612 is analogous to the earlier vessel discussed for the removal of light components from liquefied propane refrigerant and may be a single-stage gas/liquid separator or may be a multiple stage operation resulting in a greater selectivity of the light components removed from the system. The ethylene refrigerant at this location in the process is generally at a temperature in the range of from about −15° F. to about −30° F. and a pressure in the range of from about 270 psia to about 300 psia. The ethylene refrigerant, via conduit 514, then flows to a main ethylene economizer 690 wherein it is cooled via indirect heat exchange means 614 and removed via conduit 516 and passed to a pressure reduction means, such as an expansion valve 616, whereupon the refrigerant is flashed to a preselected temperature and pressure and fed to high-stage ethylene chiller 618 via conduit 518. Vapor is removed from this chiller via conduit 520 and routed to main ethylene economizer 690 wherein the vapor functions as a coolant via indirect heat exchange means 619. The ethylene vapor is then removed from ethylene economizer 690 via conduit 522 and fed to the high-stage inlets of first and second ethylene compressors 600, 602. The ethylene refrigerant which is not vaporized in high-stage ethylene chiller 618 is removed via conduit 524 and returned to ethylene economizer 690 for further cooling via indirect heat exchange means 620, removed from ethylene economizer 690 via conduit 526 and flashed in a pressure reduction means, illustrated as expansion valve 622, whereupon the resulting two-phase product is introduced into a low-stage ethylene chiller 624 via conduit 528. The liquefaction stream is removed from the high-stage ethylene chiller 618 via conduit 122 and directly fed to low-stage ethylene chiller 624 wherein it undergoes additional cooling and partial condensation via indirect heat exchange means 220. The resulting two-phase stream then flows via conduit 124 to a two phase separator 222 from which is produced a methane-rich vapor stream via conduit 128 and, via conduit 126, a liquid stream rich in C$_2$+components which is subsequently flashed or fractionated in vessel a 224 thereby producing, via conduit 132, a heavies stream and a second methane-rich stream which is transferred via conduit 164 and, after combination with a second stream via conduit 150, is fed to high-stage methane compressors 234, 236.

The stream in conduit 128 and a cooled compressed open methane cycle gas stream provided via conduit 129 are combined and fed via conduit 130 to a low-stage ethylene condenser 628 wherein this stream exchanges heat via indirect heat exchange means 226 with the liquid effluent from low-stage ethylene chiller 624 which is routed to low-stage ethylene condenser 628 via conduit 532. In condenser 628, the combined streams are condensed and produced from condenser 628, via conduit 134, is a pressurized LNG-bearing stream. The vapor from low-stage ethylene chiller 624, via conduit 530, and low-stage ethylene condenser 628, via conduit 534, are combined and routed via conduit 536 to main ethylene economizer 690 wherein the vapors function as a coolant via indirect heat exchange means 630. The stream is then routed via conduit 538 from main ethylene economizer 690 to the low-stage inlets of ethylene compressors 600, 602. As noted in FIG. 1, the compressor effluent from vapor introduced via the low-stage inlets of compressors 600, 602 is removed, cooled via inter-stage coolers 640, 642, and returned to ethylene compressors 600, 602 for injection with the high-stage stream present in conduit 522. Preferably, the two-stages are a single module although they may each be a separate module and the modules mechanically coupled to a common driver. The compressed ethylene product from ethylene compressors 600, 602 is routed to a common conduit 504 via conduits 500 and 502. The compressed ethylene is then conducted via common conduit 504 to a downstream cooler 604. The product from cooler 604 flows via conduit 506 and is introduced, as previously discussed, to high-stage propane chiller 408.

The pressurized LNG-bearing stream, preferably a liquid stream in its entirety, in conduit 134 is generally at a temperature in the range of from about −140° F. to about −110° F. and a pressure in the range of from about 600 psia to about 630 psia. This stream passes via conduit 134 through a main methane economizer 290 wherein the stream is further cooled by indirect heat exchange means 228 as hereinafter explained. From main methane economizer 290 the pressurized LNG-bearing stream passes through conduit 136 and its pressure is reduced by a pressure reductions means, illustrated as expansion valve 229, which evaporates or flashes a portion of the gas stream thereby generating a flash gas stream. The flashed stream is then passed via conduit 138 to a high-stage methane flash drum 230 where it is separated into a flash gas stream discharged through conduit 140 and a liquid phase stream (i.e., pressurized LNG-bearing stream) discharged through conduit 166. The flash gas stream is then transferred to main methane economizer 290 via conduit 140 wherein the stream functions as a coolant via indirect heat exchange means 232. The flash gas stream (i.e., warmed flash gas stream) exits main methane economizer 290 via conduit 150 where it is combined with a gas stream delivered by conduit 164. These streams are then fed to the inlets of high-stage methane compressors 234, 236. The liquid phase in conduit 166 is passed through a second methane economizer 244 wherein the liquid is further cooled via indirect heat exchange means 246 by a downstream flash gas stream. The cooled liquid exits second methane economizer 244 via conduit 168 and is expanded or flashed via a pressure reduction means, illustrated as expansion valve 248, to further reduce the pressure and at the same time, evaporate a second portion thereof. This flash gas stream is then passed to intermediate-stage methane flash drum 250 where the stream is separated into a flash gas stream passing through conduit 172 and a liquid phase stream passing through conduit 170. The flash gas stream flows through conduit 172 to second methane economizer 244 wherein the gas cools the liquid introduced to economizer 244 via conduit 166 via indirect heat exchanger means 252. Conduit 174 serves as a flow conduit between indirect heat exchange means 252 in second methane economizer 244 and indirect heat exchange means 254 in main methane economizer 290. The warmed flash gas stream leaves main methane economizer 290 via conduit 176 which is connected to the inlets of intermediate-stage methane compressors 256, 258. The liquid phase exiting intermediate stage flash drum 250 via conduit 170 is further reduced in pressure, preferably to about 25 psia, by passage through a pressure reduction means, illustrated as an expansion valve 260. Again, a third portion of the liquefied gas is evaporated or flashed. The fluids from the expansion valve 260 are passed to final or low stage flash drum 262. In flash drum 262, a vapor phase is separated as a flash gas stream and passed through conduit 180 to second methane economizer 244 wherein the flash gas stream functions as a coolant via indirect heat exchange means 264, exits second methane economizer 244 via conduit 182 which is connected to main methane economizer 290 wherein the flash gas stream functions as a coolant via indirect heat exchange means 266 and ultimately leaves main methane economizer 290 via conduit 184 which is connected to the inlets of low-stage methane compressors 268, 270. The liquefied natural gas product (i.e., the LNG stream) from flash drum 262 which is at approximately atmospheric pressure is passed through conduit 178 to the storage unit. The low pressure, low temperature LNG boil-off vapor stream from the storage unit is preferably recovered by combining such stream with the low pressure flash gases present in either conduits 180, 182, or 184; the selected conduit being based on a desire to match gas stream temperatures as closely as possible. In accordance with conventional practice, the liquefied natural gas (LNG) in the storage unit can be transported to a desired location (typically via an ocean-going LNG tanker). The LNG can then be vaporized at an onshore LNG terminal for transport in the gaseous state via conventional natural gas pipelines.

As shown in FIG. 1, methane compressors 234, 236, 256, 258, 268, 270 preferably exist as separate units that are mechanically coupled together to be driven by two drivers 704, 706. The compressed gas from the low-stage methane compressors 268, 270 passes through inter-stage coolers 280, 282 and is combined with the intermediate pressure gas in conduit 176 prior to the second-stage of compression. The compressed gas from intermediate-stage methane compressors 256, 258 is passed through inter-stage coolers 284, 286 and is combined with the high pressure gas provided via conduit 150 prior to the third-stage of compression. The compressed gas (i.e., compressed open methane cycle gas stream) is discharged from high-stage methane compressors 234,236 through conduits 152,154 and are combined in conduit 156. The compressed methane gas is then cooled in cooler 238 and is routed to high-stage propane chiller 408 via conduit 158 as previously discussed. The stream is cooled in chiller 408 via indirect heat exchange means 239 and flows to main methane economizer 290 via conduit 160. As used herein and previously noted, compressor also refers to each stage of compression and any equipment associated with interstage cooling.

As illustrated in FIG. 1, the compressed open methane cycle gas stream from chiller 408 which enters main methane economizer 290 undergoes cooling in its entirety via flow through indirect heat exchange means 240. A portion of this cooled stream is then removed via conduit 162 and combined with the processed natural gas feed stream upstream of high-stage ethylene chiller 618. The remaining portion of this cooled stream undergoes further cooling via indirect heat transfer means 242 in main methane economizer 290 and is produced therefrom via conduit 129. This stream is combined with the stream in conduit 128 at a location upstream of ethylene condenser 628 and this liquefaction stream then undergoes liquefaction in major portion in the ethylene condenser 628 via flow through indirect heat exchange means 226.

As illustrated in FIG. 1, it is preferred for first propane compressor 400 and first ethylene compressor 600 to be driven by a single first electric motor 700, while second propane compressor 402 and second ethylene compressor 602 are driven by a single second electric motor 702. First and second electric motors 700, 702 can be any suitable commercially available electric motor. It can be seen from FIG. 1 that both the propane compressors 400, 402 and the ethylene compressors 600, 602 are fluidly connected to their respective propane and ethylene refrigeration cycles in parallel, so that each compressor provides full pressure increase for approximately one-half of the refrigerant flow employed in that respective refrigeration cycle. Such a parallel configuration of multiple propane and ethylene compressors provides a "two-trains-in-one" design that significantly enhances the availability of the LNG plant. Thus, for example, if it is required to shut down first electric motor 700 for maintenance or repair, the entire LNG plant need not be shut down because second electric motor 702, second propane compressor 402, and second ethylene compressor 602 can still be used to keep the plant online.

Such a "two-trains-in-one" philosophy is further indicated by the use of two drivers 704, 706 to power methane compressors 234, 236, 256, 258, 268, 270. A third electric motor 704 is used to power first high-stage methane compressor 234, first intermediate-stage methane compressor 256, and first low-stage methane compressor 268, while a fourth electric motor 706 is used to power second high-stage methane compressor 236, second intermediate-stage methane compressor 258, and second low-stage methane compressor 270. Third and fourth electric motors 704, 706 can be any suitable commercially available electric motor. It can be seen from FIG. 1 that first methane compressors 234, 256, 268 are fluidly connected to the open methane refrigeration cycle in series with one another and in parallel with second methane compressors 236, 258, 270. Thus, first methane compressors 234, 256, 268 cooperate to provide full pressure increase for approximately one-half of the methane refrigerant flow in the open methane refrigeration cycle, with each first compressor 268, 256, 234 providing an incremental portion of such full pressure increase. Similarly, second methane compressors 236, 258, 270 cooperate to provide full pressure increase for the other approximately one-half of the methane refrigerant flow in the open methane refrigeration cycle, with each second compressor 270, 258, 236 providing an incremental portion of such full pressure increase. Such a configuration of methane drivers and compressors is consistent with the "two-trains-in-one" design philosophy. Thus, for example, if it is required to shut down third electric motor 704 for maintenance or repair, the entire LNG plant need not be shut down because fourth electric motor 706 and second methane compressors 236, 258, 270 can still be used to keep the plant online.

Various methods may be used to assist in starting-up electric motors 700, 702, 704, 706. The inertial and fluid drag forces associated with the initial turning of electric motors 700, 702, 704, 706 and their associated compressor during start-up can be difficult to overcome. Thus, a variable frequency drive may be coupled to electric motors 700, 702, 704, 706 to aid in start-up. Another method of assisting in start-up can include evacuating the compressors to minimize fluid drag forces that resist turning of the motors during start-up. Further, fluid couplings or torque converters can be placed between the motors and the compressors so that the motors can be started with little or no load from the compressors and then, when the motors are up to speed, the fluid couplings or torque converters can gradually apply the compressor load to the motors. If a torque converter is employed, it is preferred for the torque converter to use a mechanical lock-out mechanism that allows the electric motor and associated compressors to be directly mechanically coupled to one another once the motor and compressors are up to speed.

Figure 2:
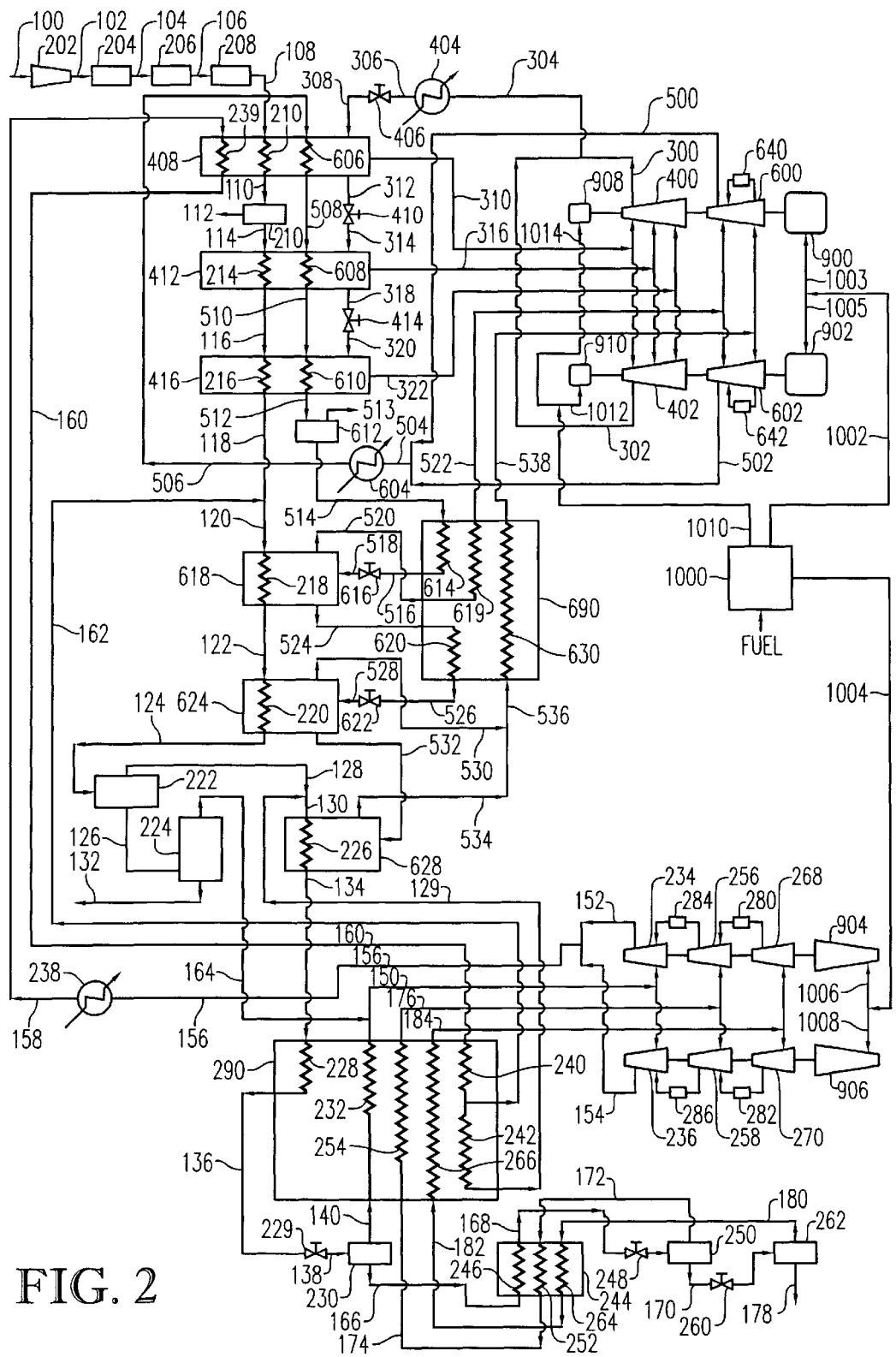
FIG. 2 is a simplified flow diagram similar to FIG. 1 illustrating an alternative driver and power system for a LNG plant. The numbering scheme employed in FIG. 2 is identical to that in FIG. 1, except in FIG. 2 numerals 900–999 identify the drivers while numerals 1000–1099 identify the power system.

Referring now to FIG. 2, an alternative embodiment of the natural gas liquefaction system is illustrated. Although many components of the natural gas liquefaction system illustrated in FIG. 2 are the same as those illustrated in FIG. 1, the system of FIG. 2 employs an alternative driver and power system. The majority of the components in FIG. 2 (i.e., components 100–699) are the same as the components in FIG. 1 and are identically enumerated.

The natural gas liquefaction system illustrated in FIG. 2 employs a cogeneration plant 1000 that is operable to simultaneously generate energy in the form of thermal energy (i.e., steam) and electrical energy via combustion of a fuel such as, for example, natural gas. First propane compressor 400 and first ethylene compressor 600 are driven by a first electric motor 900, while second propane compressor 402 and second ethylene compressor 602 are driven by a second electric motor 902. Electric motors 900, 902 are powered with at least a portion of the electricity generated by cogeneration plant 1000 and conducted to motors 900, 902 via electrical lines 1002, 1003, 1005.

A first steam turbine 904 is used to power first high-stage compressor 234, first intermediate-stage methane compressor 256, and first low-stage methane compressor 268, while a second steam turbine 906 is used to power second high-stage methane compressor 236, second intermediate-stage methane compressor 258, and second low-stage methane compressor 270. Steam turbines 904, 906 are powered with at least a portion of the steam generated by cogeneration plant 1000 and conducted to steam turbines 904, 906 via steam conduits 1004, 1006, 1008.

A first starter/helper motor 908 can be drivingly coupled to first electric motor 900, while a second starter/helper motor 910 can be drivingly coupled to second electric motor 902. Starter/helper motors 908, 910 can operate in either a starting mode, wherein starter/helper motors 908, 910 assist in turning the larger motors 900, 902 during start-up, or starter/helper motors 908, 910 can operate in a helping mode, wherein starter/helper motors 908, 910 assist electric motors 900, 902 in powering compressors 400, 402, 600, 602 during normal operation. Starter/helper motors 908, 910 are powered with electricity generated by cogeneration plant 1000 and conducted via electrical lines 1010, 1012, 1014.

Figure 3:
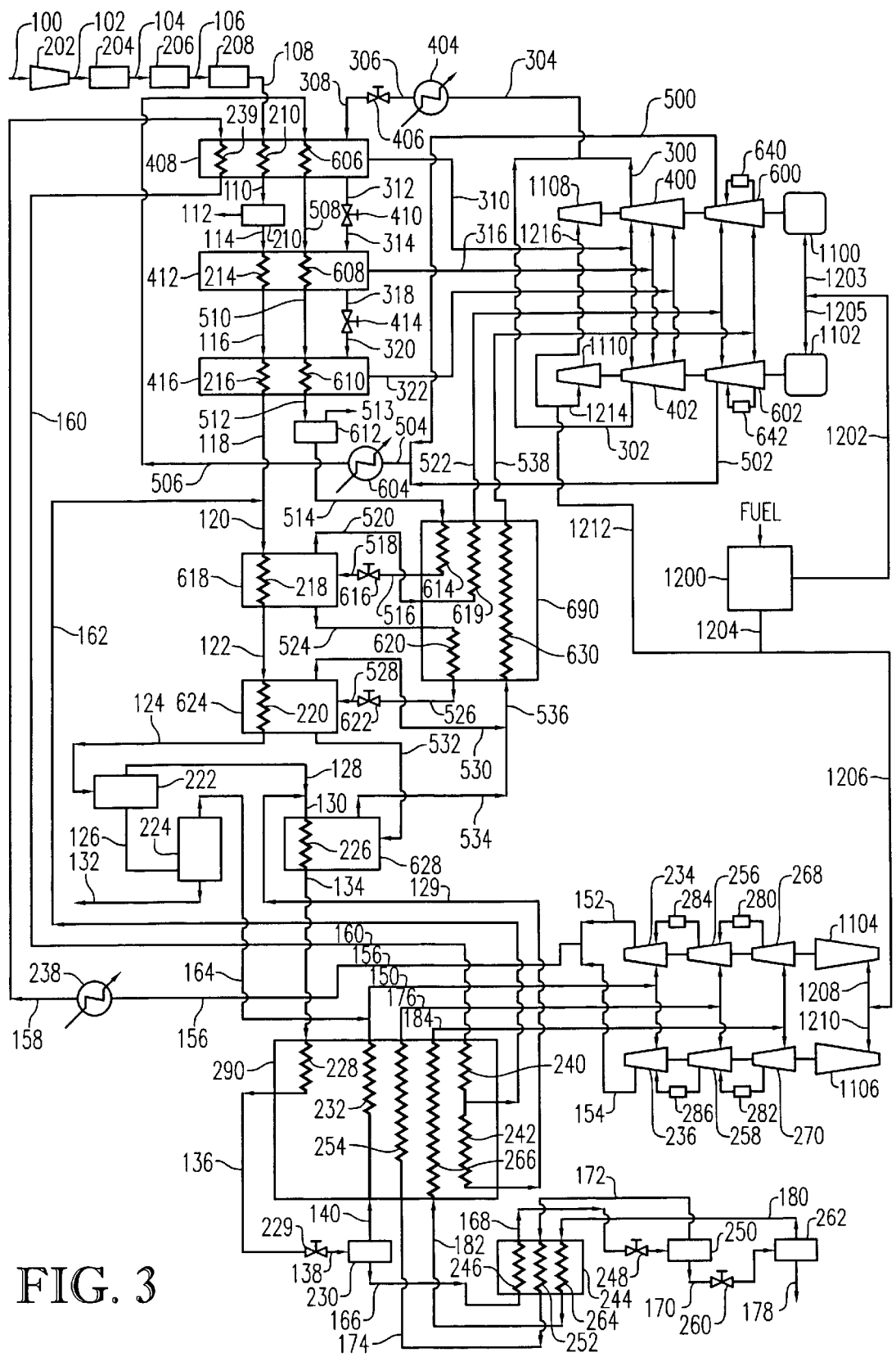
FIG. 3 is a simplified flow diagram similar to FIGS. 1 and 2 illustrating an alternative driver and power system for a LNG plant. The numbering scheme employed in FIG. 3 is identical to that in FIGS. 1 and 2, except in FIG. 3 numerals 1100–1199 identify the drivers while numerals 1200–1299 identify the power system.

Referring now to FIG. 3, a natural gas liquefaction system similar to those illustrated in FIGS. 1 and 2 is shown as including an alternative driver and power system. A cogeneration plant 1200 is used to power electric motors 1100, 1102 via electricity conducted through electrical lines 1202, 1203, 1205. Cogeneration plant 1200 is also operable to power steam turbines 1104, 1106 via steam conducted through steam conduits 1204, 1206, 1208, 1210.

A first starter/helper steam turbine 1108 is drivingly coupled to first electric motor 1100, while a second starter/helper steam turbine 1110 is drivingly coupled to second electric motor 1102. Starter/helper steam turbines 1108, 1110 are powered with steam generated by cogeneration plant 1200 and conducted to starter/helper steam turbines 1108, 1110 via conduits 1204, 1212, 1214, 1216. During start-up, starter/helper steam turbines 1108, 1110 can help turn electric motors 1100, 1102. During normal operation of the natural gas liquefaction system, starter/helper steam turbines 1108, 1110 can assist electric motors 1100, 1102 in driving compressors 400, 402, 600, 602.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for liquefying natural gas, said process comprising the steps of:
    (a) driving a first compressor and a second compressor with a first electric motor;
    (b) driving a third compressor and a fourth compressor with a second electric motor;
    (c) compressing a first refrigerant of a first refrigeration cycle in the first and third compressors; and
    (d) compressing a second refrigerant of a second refrigeration cycle in the second and fourth compressors.

2. The process according to claim 1,
    said first and third compressors being fluidly connected to the first refrigeration cycle in parallel,
    said second and fourth compressors being fluidly connected to the second refrigeration cycle in parallel.

3. The process according to claim 2,
    said first refrigerant comprising in major portion a hydrocarbon selected from the group consisting of propane, propylene, and mixtures thereof.

4. The process according to claim 3,
    said second refrigerant comprising in major portion a hydrocarbon selected from the group consisting of ethane, ethylene, and mixtures thereof.

5. The process according to claim 3; and
    (e) driving a fifth compressor with a third electric motor; and
    (f) compressing a third refrigerant of a third refrigeration cycle in the fifth compressor.

6. The process according to claim 5,
    said second refrigerant comprising in major portion a hydrocarbon selected from the group consisting of ethane, ethylene, and mixtures thereof,
    said third refrigerant comprising in major portion methane.

7. The process according to claim 6; and
    (g) driving a sixth compressor with a fourth electric motor; and
    (h) compressing the third refrigerant of the third refrigeration cycle in the sixth compressor.

8. The process according to claim 7,
    said fifth and sixth compressors being fluidly connected to the third refrigeration cycle in parallel.

9. The process according to claim 8,
    said first refrigerant comprising in major portion propane,
    said second refrigerant comprising in major portion ethylene,
    said third refrigerant comprising in major portion methane.

10. The process according to claim 1; and
    (i) vaporizing liquefied natural gas produced via steps (a)–(d).

11. A process for liquefying natural gas, said process comprising the steps of:
    (a) generating steam and electricity in a cogeneration plant;
    (b) using at least a portion of the electricity to power a first electric motor;
    (c) using at least a portion of the steam to power a first steam turbine;
    (d) compressing a first refrigerant of a first refrigeration cycle in a first compressor driven by the first electric motor;
    (e) compressing a second refrigerant of a second refrigeration cycle in a second compressor driven by the first steam turbine;
    (f) using at least a portion of the electricity to power a second electric motor;
    (g) compressing the first refrigerant of the first refrigeration cycle in a third compressor driven by the second electric motor;
    (h) using at least a portion of the steam to power a second steam turbine; and
    (i) compressing the second refrigerant of the second refrigeration cycle in a fourth compressor driven by the second steam turbine,
    said first and third compressors being fluidly coupled to the first refrigeration cycle in parallel,
    said second and fourth compressors being fluidly coupled to the second refrigeration cycle in parallel.

12. The process according to claim 11,
    said first refrigerant comprising in major portion propane, propylene, and mixtures thereof.

13. The process according to claim 12,
    said second refrigerant comprising in major portion methane.

14. The process according to claim 11,
    said first refrigerant comprising in major portion a hydrocarbon selected from the group consisting of propane, propylene, and mixtures thereof,
    said second refrigerant comprising in major portion methane.

15. The process according to claim 14; and
    (j) compressing a third refrigerant of a third refrigeration cycle in a fifth compressor driven by the first electric motor; and
    (k) compressing the third refrigerant of the third refrigerant cycle in a sixth compressor driven by the second electric motor.

16. The process according to claim 15,
    said fifth and sixth compressors being fluidly coupled to the third refrigeration cycle in parallel.

17. The process according to claim 16,
    said first refrigerant comprising in major portion propane,
    said second refrigerant comprising in major portion methane,
    said third refrigerant comprising in major portion ethylene.

18. The process according to claim 11; and
    (1) vaporizing liquefied natural gas produced via steps (a)–(e).

19. An apparatus for liquefying natural gas by cooling the natural gas via a plurality of sequential refrigeration cycles employing different refrigerants, said apparatus comprising:

a first refrigeration cycle including a first compressor for compressing a first refrigerant;

a second refrigeration cycle including a second compressor for compressing a second refrigerant;

a third refrigeration cycle including a third compressor for compressing a third refrigerant;

a first electric motor for driving the first compressor;

a second electric motor for driving the second compressor; and a third electric motor for driving the third compressor, said first refrigerant comprising in major portion a hydrocarbon selected from the group consisting of propane, propylene, and mixtures thereof, said second refrigerant comprising in major portion a hydrocarbon selected from the group consisting of ethane, ethylene, and mixtures thereof, said third refrigerant comprising in major portion methane, said second refrigeration cycle including a fourth compressor drivingly coupled to the first electric motor and operable to compress the second refrigerant, said first refrigeration cycle including a fifth compressor drivingly coupled to the second electric motor and operable to compress the first refrigerant, said first and fifth compressors being fluidly integrated in the first refrigeration cycle in parallel, said second and fourth compressors being fluidly integrated in the second refrigeration cycle in parallel.

20. The apparatus according to claim 19, said first refrigeration cycle being located upstream of the second refrigeration cycle, said second refrigeration cycle being located upstream of the third refrigeration cycle.

21. The apparatus according to claim 19, said third refrigeration cycle being an open methane cycle.

22. The apparatus according to claim 19, said first refrigerant comprising in major portion propane, said second refrigerant comprising in major portion ethylene, said third refrigerant comprising in major portion methane.

23. The apparatus according to claim 19, said first refrigerant comprising in major portion propane, said second refrigerant comprising in major portion ethylene.

24. An apparatus for liquefying natural gas by cooling the natural gas via a plurality of sequential refrigeration cycles employing different refrigerants, said apparatus comprising:

a first refrigeration cycle including a first compressor for compressing a first refrigerant;

a second refrigeration cycle including a second compressor for compressing a second refrigerant;

a third refrigeration cycle including a third compressor for compressing a third refrigerant;

a first electric motor for driving the first compressor;

a second electric motor for driving the second compressor; and a third electric motor for driving the third compressor, said first refrigerant comprising in major portion a hydrocarbon selected from the group consisting of propane, propylene, and mixtures thereof, said second refrigerant comprising in major portion a hydrocarbon selected from the croup consisting of ethane, ethylene, and mixtures thereof, said third refrigerant comprising in major portion methane; and a starter/helper motor drivingly coupled to the first electric motor, said starter/helper motor being operable to help start the turning of the first electric motor during start-up of the first electric motor when the starter/helper motor is operated in a starting mode, said starter/helper motor being operable to help the first electric motor drive the first compressor when the starter/helper motor is operated in a helping mode.

25. An apparatus for liquefying natural gas by cooling the natural gas via a plurality of sequential refrigeration cycles employing different refrigerants, said apparatus comprising:

a first refrigeration cycle including a first compressor for compressing a first refrigerant;

a second refrigeration cycle including a second compressor for compressing a second refrigerant;

a third refrigeration cycle including a third compressor for compressing a third refrigerant;

a first electric motor for driving the first compressor;

a second electric motor for driving the second compressor;

a third electric motor for driving the third compressor, said first refrigerant comprising in major portion a hydrocarbon selected from the group consisting of propane, propylene, and mixtures thereof, said second refrigerant comprising in major portion a hydrocarbon selected from the group consisting of ethane, ethylene, and mixtures thereof, said third refrigerant comprising in major portion methane; and a steam turbine drivingly coupled to the first electric motor and operable to help start the first electric motor.

26. An apparatus for liquefying natural gas by cooling the natural gas via a plurality of sequential refrigeration cycles employing different refrigerants, said apparatus comprising:

a first refrigeration cycle including a first compressor for compressing a first refrigerant;

a second refrigeration cycle including a second compressor for compressing a second refrigerant;

a third refrigeration cycle including a third compressor for compressing a third refrigerant;

a first electric motor for driving the first compressor;

a second electric motor for driving the second compressor;

a third electric motor for driving the third compressor, said first refrigerant comprising in major portion a hydrocarbon selected from the group consisting of propane, propylene, and mixtures thereof, said second refrigerant comprising in major portion a hydrocarbon selected from the group consisting of ethane, ethylene, and mixtures thereof, said third refrigerant comprising in major portion methane;

a steam turbine drivingly coupled to the first electric motor and operable to help start the first electric motor; and a cogeneration plant operable to generate electricity and steam, said first, second, and third electric motors being powered by at least a portion of the electricity, said steam turbine being powered by at least a portion of the steam.

27. An apparatus for liquefying natural gas by cooling the natural gas via a plurality of sequential refrigeration cycles employing different refrigerants, said apparatus comprising:

a first refrigeration cycle including a first compressor for compressing a first refrigerant;

a second refrigeration cycle including a second compressor for compressing a second refrigerant;

a cogeneration plant for simultaneously generating electricity and steam;

a first electric motor drivingly coupled to the first compressor and powered by at least a portion of the electricity;

a first steam turbine drivingly coupled to the second compressor and powered by at least a portion of the steam; and a first starter steam turbine drivingly coupled to the first electric motor and powered by at least a portion of the steam.

28. The apparatus according to claim 27, said first refrigerant comprising in major portion a hydrocarbon selected from the group consisting of propane, propylene, and mixtures thereof.

29. The apparatus according to claim 28, said second refrigerant comprising in major portion methane.

30. An apparatus for liquefying natural gas by cooling the natural gas via a plurality of sequential refrigeration cycles employing different refrigerants, said apparatus comprising:

a first refrigeration cycle including a first compressor for compressing a first refrigerant;

a second refrigeration cycle including a second compressor for compressing a second refrigerant;

a cogeneration plant for simultaneously generating electricity and steam;

a first electric motor drivingly coupled to the first compressor and powered by at least a portion of the electricity;

a first steam turbine drivingly coupled to the second compressor and powered by at least a portion of the steam, said second refrigeration cycle including a third compressor for compressing the second refrigerant; and a second steam turbine drivingly coupled to the third compressor and powered by at least a portion of the steam, said second and third compressors being fluidly integrated in the second refrigeration cycle in parallel.

31. The apparatus according to claim 30; and a third refrigeration cycle including a fourth compressor for compressing a third refrigerant; and a second electric motor drivingly coupled to the fourth compressor and powered by at least a portion of the electricity.

32. The apparatus according to claim 31, said third refrigeration cycle including a fifth compressor being drivingly coupled to the first electric motor and operable to compress the third refrigerant; and said first refrigeration cycle including a sixth compressor being drivingly coupled to the second electric motor and operable to compress the first refrigerant.

33. The apparatus according to claim 32, said first and sixth compressors being fluidly integrated in the first refrigeration cycle in parallel, said fourth and fifth compressors being fluidly integrated in the third refrigeration cycle in parallel.

34. The apparatus according to claim 33, said first refrigerant comprising in major portion propane.

35. The apparatus according to claim 34, said second refrigerant comprising in major portion methane, said third refrigerant comprising in major portion ethylene.

* * * * *